No. 871,109. PATENTED NOV. 19, 1907.
G. H. COATES.
STEERING MECHANISM FOR MOTOR CARS.
APPLICATION FILED MAR. 28, 1904.
2 SHEETS—SHEET 1.
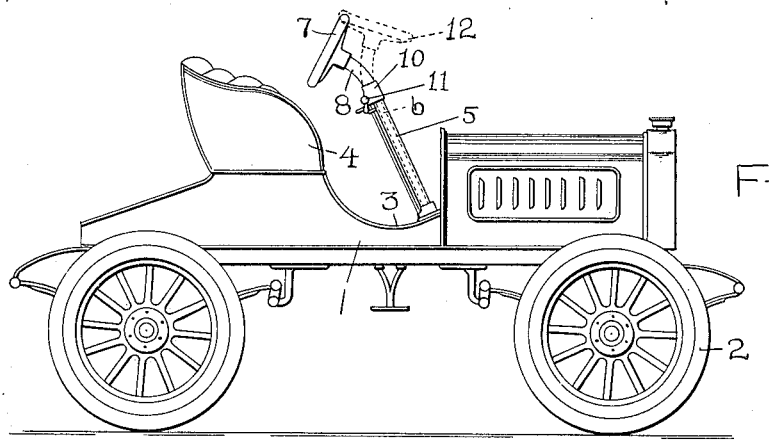
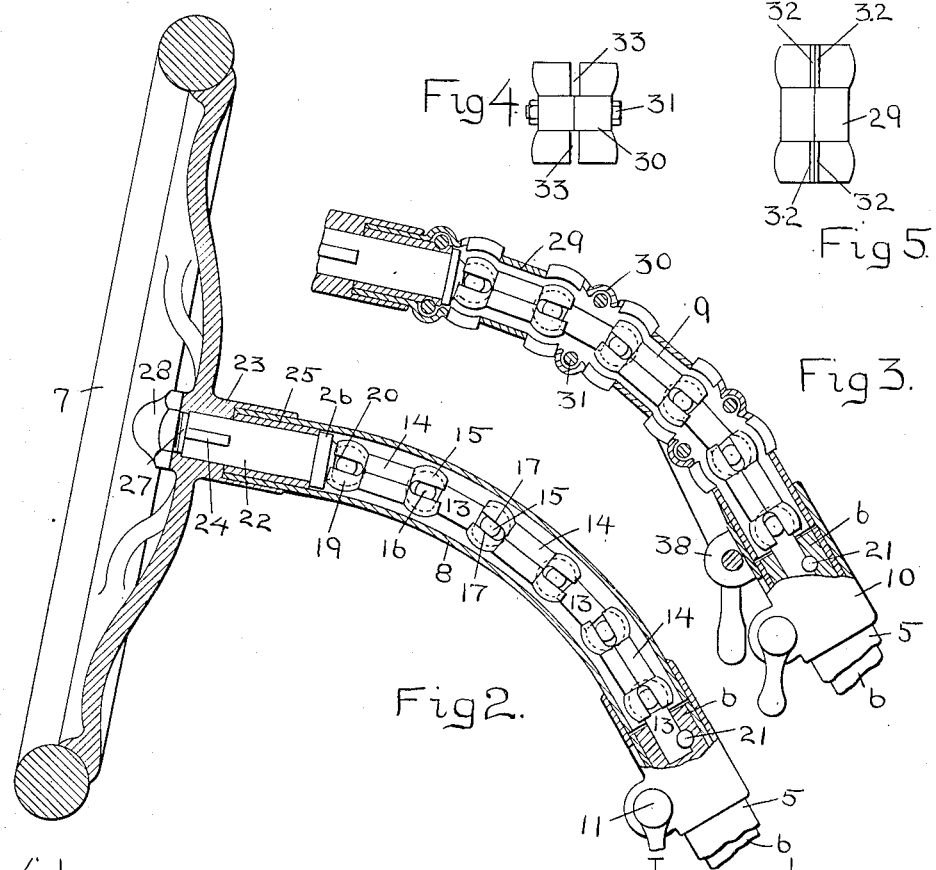
Witnesses
Roy D. Tolman.
Penelope Comberbach.
Inventor
George H. Coates.
By Rufus B. Fowler
Attorney No. 871,109.
PATENTED NOV. 19, 1907.
G. H. COATES.
STEERING MECHANISM FOR MOTOR CARS.
APPLICATION FILED MAR. 28, 1904.
2 SHEETS—SHEET 2.
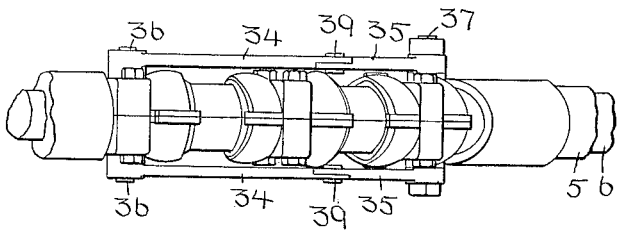
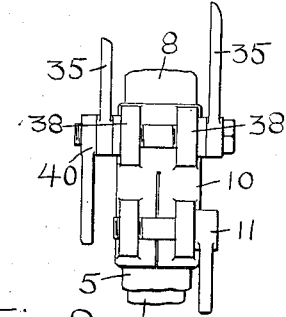
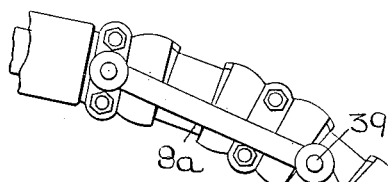
Fig. 6.
Fig. 8.
Fig. 7.
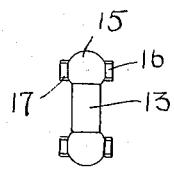
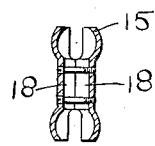
Fig. 9.  Fig. 10.
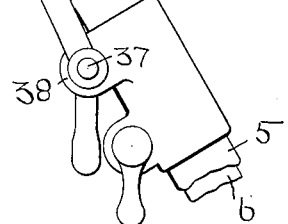
Fig 11
Witnesses
Roy D. Tolman.
Penelope Cumberbach.
Inventor
George H. Coates.
By Rufus B. Fowler
Attorney

UNITED STATES PATENT OFFICE.

GEORGE H. COATES, OF WORCESTER, MASSACHUSETTS.

STEERING MECHANISM FOR MOTOR-CARS.

No. 871,109.     Specification of Letters Patent.     Patented Nov. 19, 1097.

Application filed March 28, 1904. Serial No. 200,264.

*To all whom it may concern:*

Be it known that I, GEORGE H. COATES, a citizen of the United States, residing at Worcester, in the county of Worcester and Commonwealth of Massachusetts, have invented a new and useful Improvement in a Steering Mechanism for Motor-Cars, of which the following is a specification, accompanied by drawings forming a part of the same, in which—

Figure 1 represents a side elevation of a motor car embodying my improvement. Fig. 2 is a central sectional view of the upper and curved end of the steering post and steering wheel. Fig. 3 is a central sectional view of the curved section of the steering post showing a modification in the inclosing case. Figs. 4 and 5 represent detached views of the telescopic sections of the inclosing case as represented in sectional view in Fig. 3. Figs. 6 and 7 are respectively top and side elevations of the curved section of the steering post as shown in sectional view in Fig. 3. Fig. 8 is a rear view of the clamping sleeve at the lower end of the curved section. Figs. 9 and 10 represent sections of the flexible shaft inclosed in the curved section of the steering post, and Fig. 11 is a central sectional view of the curved section of the steering post showing another modification in the inclosing case.

Similar reference letters and figures refer to similar parts in the different views.

My invention relates to the steering apparatus of a motor car and particularly to that class which comprise a hollow steering post or mast erected upon the floor of the car in front of the seat and inclosing a rotating shaft having at its upper end a steering wheel, and being operatively connected at its lower end with the forward wheels of the vehicle, and the object of my invention is to provide means whereby the plane of the steering wheel may be operatively placed in a plane at other than a right angle to the axis of the rotating shaft inclosed in the steering post, and it consists in the construction and arrangement of parts as hereinafter described and pointed out in the annexed claims.

Referring to the accompanying drawings 1 denotes the body of a motor car, 2 one of the forward wheels controlled by the steering mechanism, 3 the floor of the car, and 4 the operator's seat. Erected upon the floor of the car and in front of the seat is a hollow steering post 5, preferably placed at a slight angle to a perpendicular and inclosing a rotating shaft indicated by the broken lines 6 in Fig. 1, and having its upper end represented in Figs. 2 and 3. The lower end of the shaft 6 is operatively connected with the forward wheels of the vehicle by any of the well known mechanisms now employed for that purpose, whereby the rotation of the shaft 6 is made to control the direction of the forward wheels 2.

I have not deemed it necessary for the purpose of illustrating my present invention to show the intermediate mechanism between the forward wheels 2 and the rotating shaft 6, as various devices for accomplishing this purpose are now in use in motor vehicles and their construction and operation will be well understood by those conversant with this class of vehicles.

It is customary in steering mechanisms of the class herein described to attach a steering wheel 7 to the upper end of the rotating shaft 6 by which the shaft is rotated by the operator with the plane of the steering wheel 7 at right angles to the axis of the shaft, the plane of the steering wheel being fixed during the operation of the vehicle and determined by the angle of the shaft 6 to a perpendicular line. An operative position of the steering wheel which is most convenient for the purpose of steering the vehicle brings the wheel into such close proximity to the seat as to render access thereto difficult, and to remedy this various expedients have been adopted, such as hinging the steering post at its lower end to enable it to be swung forward and away from the seat, or by making either a tilting or sliding connection between the steering wheel and the upper end of the shaft. By my present invention I avoid either of these expedients by providing the hollow steering post with a curved section 8 at its upper end and connecting the shaft 6 with the steering wheel 7 by means of a flexible shaft 9 inclosed in the curved section 8 of the steering post, as shown in Fig. 1, and also in enlarged sectional view in Fig. 2. I also provide a swivel connection between the curved section 8 and the straight section 5 by attaching the lower end of the curved section 8 to a split sleeve 10 which incloses the upper end of the hollow post 5 and is capable of being tightened thereon by a clamping bolt 11, so that by loosening the bolt 11 the sleeve 10 may be rotated on the hollow post 5 allowing the curved section 8 and wheel 7 to be swung from the position shown in Fig. 1 to that indicated by the broken lines 12, Fig. 1, thereby carrying the steering wheel 7 forward sufficiently to allow free access to the seat.

The construction of the curved section 8 and flexible shaft inclosed therein is shown in Fig. 2 of the drawings. The upper end of the shaft 6 is connected with the wheel 7 by a flexible shaft which may be of any known and suitable form of construction, but consists in the present instance of a flexible shaft formed by a series of links connected by ball and socket joints as described in my pending application for Letters Patent Serial No. 23,194. The flexible chain shown in the accompanying drawings is composed alternately of links 13 and 14, said links 13, Fig. 9, having spherical ends 15 carrying gudgeons 16 provided with flattened sides 17. The links 14 are tubular and are made in halves 18, 18, as shown in sectional view in Fig. 10, and are provided at their ends with spherical sockets 19 to receive the spherical ends 15 of the links 13, and provided with slots 20 to receive the gudgeons 16. The gudgeons 16 are capable of a rocking motion in the spherical ends of the links 13 and also of a slight sliding movement in the slots 20 of the links 14. At the lower end of the flexible chain the link 13 is provided with a spherical end at one end only, the opposite end being inserted in the upper end of the shaft 6 and held from turning therein by a pin 21. The upper link of the chain consists of an enlarged spindle 22 entering the hub 23 of the wheel 7 and being connected therewith by a spline 24. The flexible chain is inclosed in the curved tube 8 forming the curved section of the steering post. The lower end of the curved tube 8 is brazed or otherwise attached to the split sleeve 10 and the upper end of the curved section 8 is brazed or otherwise attached to an interior sleeve 25 which incloses the spindle 22 and is held thereon by a collar 26 on the spindle 22. The upper end of the spindle 22 is screw threaded at 27 to receive a nut 28 by which the steering wheel is held in position. The rotation of the steering wheel 7 imparts a rotary motion to the shaft 6 through the links 13 and 14. The curved section 8 serves to bring the steering wheel 7 nearer the operator and also brings the wheel into nearly a vertical position in which it can be conveniently seized by the operator.

In Figs. 3, 6 and 7 I have shown a modification of the inclosing case forming the curved section of the post by which the curvature may be varied. As shown in Figs. 3, 6 and 7 the curved section is formed of a series of short sections 29 and 30 each of which are formed in halves which when placed together form tubular sections, with the ends of the sections curved and telescoped by the insertion of the ends of the sections 29 within the ends of the sections 30, thereby forming articulated joints on the plane of the gudgeons 16. The halves of the sections 30 are held together by bolts 31 and, as the sections 30 inclose the ends of the sections 29 they serve to hold the halves of the sections 29 in contact. The rotation of the sections 29 and 30 upon each other is prevented by forming outwardly projecting ribs 32 at the curved ends of the sections 29 which are inserted in slots 33 in the section 30. The sections 29 and 30 form a jointed case 8ª and as the curved ends of the sections 29 are capable of a slight sliding movement within the curved ends of the sections 30, the curvature of the jointed case inclosing the flexible shaft 9 may be slightly varied. The desired curvature of the jointed case 8ª, however, is maintained by a pair of jointed links 34, 35, on opposite sides of the case. The links 34 are pivoted on studs 36 projecting from opposite sides of the case and the links 35 are pivoted at their lower ends upon a bolt 37 held in lugs 38 projecting from the side of the sleeve 10 and the links 34 and 35 are pivoted together at 39. When the jointed case 8ª has been adjusted at the desired curvature, the lower ends of the links 35 are clamped rigidly against the lugs 38 by means of a handled clamping nut 40. While I deem the jointed case 8ª in some respects preferable, I can obtain a variation in the curvature of the curved section of the steering post by means of the construction shown in Fig. 11, which consists in inclosing the flexible shaft 9 by a case consisting of a closely coiled wire spring 41 and covering the outside of the coiled spring by a flexible covering 42 of canvas, leather or similar material.

What I claim as my invention and desire to secure by Letters Patent is:—

1. In a steering mechanism for motor vehicles, the combination with a rotating shaft, of an inclosing case for said shaft consisting of a straight section and a curved section capable of rotating about an axis coincident with the axis of said straight section, a joint between said straight section and said curved section, and means for locking said curved section at any point in its movement about said straight section.

2. In a steering mechanism for motor vehicles, the combination with a rotatable steering shaft, of an inclosing case for said shaft, consisting of a fixed straight section and a curved section provided with a sleeve inclosing the upper end of the straight section, whereby said curved section is capable of rotation about the axis of said straight section, and means for tightening said sleeve on said straight section.

3. In a steering mechanism for motor vehicles, the combination with a rotating shaft, of an inclosing case for said shaft consisting of a straight section and a curved section, and a split sleeve connected with said curved section and detachably attached to the upper end of said straight section.

4. In a steering mechanism for motor vehicles, the combination with a steering wheel and rotating shaft, of an inclosing case for said shaft consisting of a straight section and a section supporting said wheel, with the axis of said wheel at an oblique angle to the axis of said straight section, a swiveled joint connecting said sections, and means carried by said oblique section for locking it to said straight section in any position of said swiveled joint.

5. In the steering mechanism of a motor vehicle, the combination with a rotating shaft having a flexible section, of an inclosing case having a straight section and a curved section inclosing the flexible section of the shaft, a sleeve attached to one end of the curved section of the case and inclosing the end of the straight section of the case, a steering wheel journaled at the opposite end of said curved section and connected with said flexible shaft.

6. In a steering mechanism for motor vehicles, the combination with a rotating shaft, of an inclosing case, consisting of a rigid straight section and a section the curvature of which is adjustable, and a swiveled joint connecting said sections.

7. In a steering mechanism for motor vehicles, the combination with a rotating shaft, of an inclosing case consisting of a rigid straight section and a section the curvature of which is adjustable.

8. In a steering mechanism for motor vehicles, the combination with a rotating shaft, of an inclosing case, consisting of a rigid straight section and a section the curvature of which is adjustable, and means for maintaining said adjustable section at a predetermined curvature.

9. In a steering mechanism for motor vehicles, the combination with a rotating shaft, of an inclosing case, consisting of a rigid straight section and a section the curvature of which is adjustable, a swiveled joint connecting said sections and means for locking said adjustable section.

10. In a steering mechanism for motor vehicles, the combination with a rotating shaft, of an inclosing case consisting of a rigid straight section and a section composed of a series of short portions, articulated joints uniting said short portions, and means for holding said jointed section at a predetermined curvature.

Dated this 26th day of March 1904.

GEORGE H. COATES.

Witnesses:
RUFUS B. FOWLER,
PENELOPE COMBERBACH.